C. P. Jadwin,
Clothes Drier,
No. 67,310 — Patented July 30, 1867.
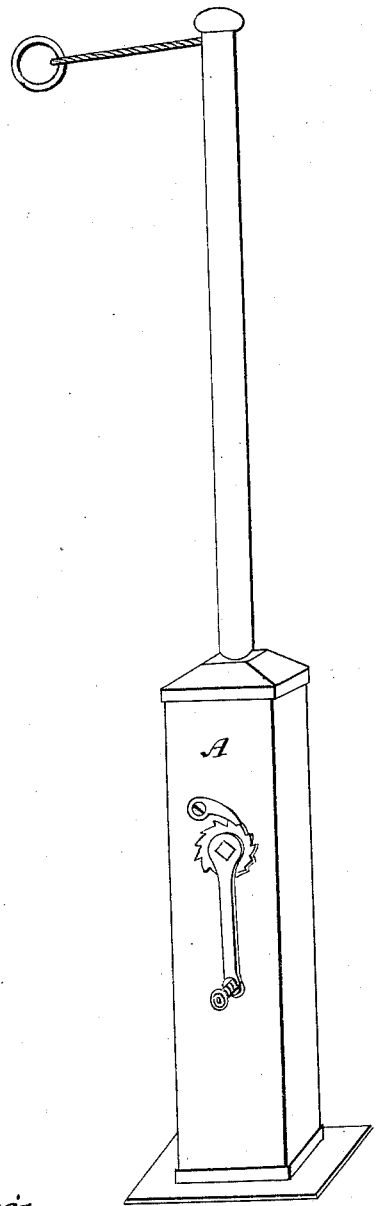
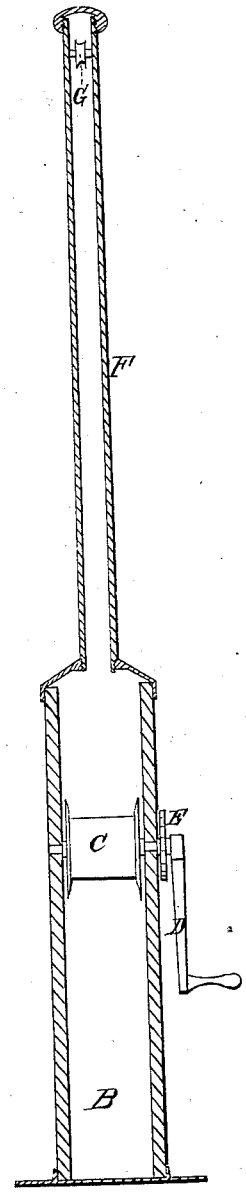
Witnesses.
J. G. Thompson
John W. Aitken
Inventor.
Chas. P. Jadwin

United States Patent Office.

CHARLES P. JADWIN, OF CARBONDALE, PENNSYLVANIA.

Letters Patent No. 67,310, dated July 30, 1867.

IMPROVED CLOTHES-POST.

*The Schedule referred to in these Letters Patent and making part of the same.*

TO ALL WHOM IT MAY CONCERN:

Be it known that I, CHARLES P. JADWIN, of the city of Carbondale, in the State of Pennsylvania, have invented a new and improved Clothes-Post; and I hereby declare that the following is a full and exact description thereof, reference being had to the accompanying drawings and the letters of reference marked thereon.

The nature of my invention consists in providing a box-base with a drum inside to wind the clothes-line upon by means of a crank and ratchet attached, and a hollow post fastened in the top of box, with a small pulley fixed inside of the hollow post at the top, with a hole made through the side of post, through which the clothes-line is to be passed over the pulley, down through the hollow post, and fastened to the drum inside of the base, upon which it is to be wound and unwound by means of the crank, and held by the ratchet, and where the clothes-line will be kept secure from the action of changeable weather while not in use, or drawn out for use and fastened to anything desired, and slackened or made tight by means of the crank and ratchet.

To enable others skilled in the art to make and use my invention, I will proceed to describe its construction and operation.

I construct my clothes-post A by making box-base B of any suitable material or size that is desired, inside of which I fix the drum C, into which I connect the crank D and ratchet E that I work on the outside of the box-base. I construct and fasten into the top of the box-base the hollow post F, with the pulley G fitted inside at the top, and a hole through the side of the post large enough to pass the clothes-line through over the pulley, down through the hollow post, and fasten it to drum in the box-base, upon which I wind it, and where I keep it, when not in use, secure from storm or the action of the weather. I have also a ring, or any other suitable arrangement, fastened to the outer end of the clothes-line to keep it from being drawn inside of the post, and also to fasten it to any desirable place or thing when drawn out for use, and when I slacken or tighten it by means of the crank and ratchet that are attached to the post.

What I claim as my invention, and desire to secure by Letters Patent, is—

The box-base, with drum, crank, and ratchet attached, and hollow post, with pulley and rope, as herein described, and for the purposes set forth.

CHAS. P. JADWIN.

Witnesses:
JESSE G. THOMPSON,
JNO. W. AITKEN.